Figure 1:
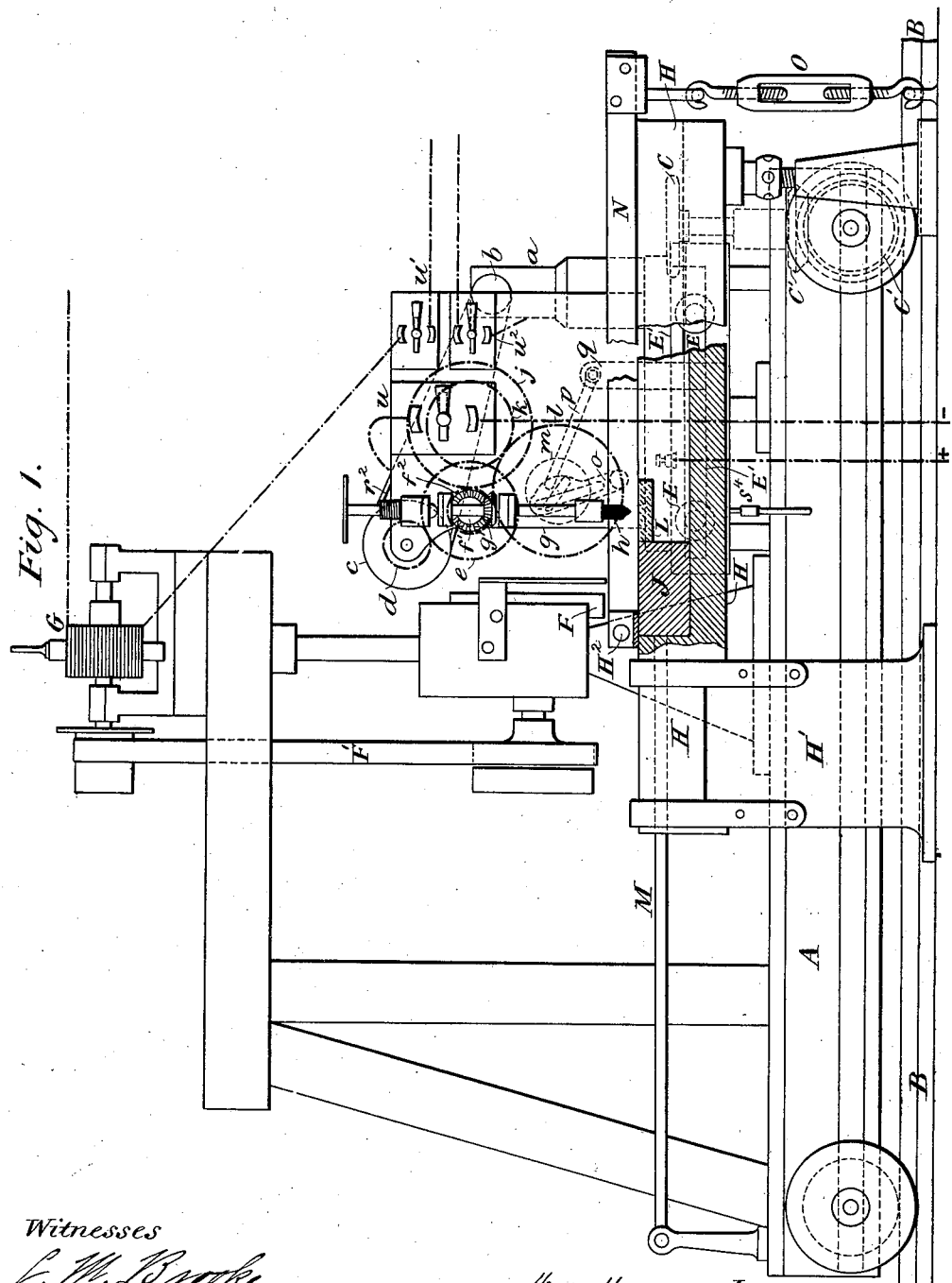

(No Model.)  3 Sheets—Sheet 3.

H. HOWARD.
ARC METAL WORKING APPARATUS.

No. 467,752.  Patented Jan. 26, 1892.

Witnesses  Inventor:
Baltus DeLong.  Henry Howard.
C. M. Brooke.  By his Attys.
  Baldwin Davidson & Wight

UNITED STATES PATENT OFFICE.

HENRY HOWARD, OF HALESOWEN, ENGLAND.

ARC METAL-WORKING APPARATUS.

SPECIFICATION forming part of Letters Patent No. 467,752, dated January 26, 1892.

Application filed July 6, 1891. Serial No. 398,593. (No model.)

*To all whom it may concern:*

Be it known that I, HENRY HOWARD, manufacturer, a subject of the Queen of Great Britain, residing at Coomb's Wood Tube Works, Halesowen, near Birmingham, England, have invented certain new and useful Improvements in Apparatus for Heating and Welding Metals by Means of the Electric Arc, of which the following is a specification.

The methods of heating and welding metals by electricity heretofore practised may, for the purposes of this specification, be divided into two classes. In the first of these classes the two pieces of metal to be welded are placed in contact with each other, and a heating current of electricity is passed through the junction. This method, while advantageous for some purposes, is subject to some serious practical objections, such as that it is only applicable to butt-welded joints, which are less frequently employed in the arts than lap-welded ones. The character of the metal subjected to this process is liable to be changed from the ordinary fibrous structure to a crystaline condition along the line of welding, which renders the metal too brittle to withstand cross strains or to be bent as is often required. In the second of these classes the heating and welding is performed by the electric arc, the work itself forming one electrode, pole, or terminal of the circuit, while a pencil forms the other one. This system I regard as more advantageous than the other, inasmuch as it will successfully produce either butt-welded or lap-welded joints, even in steel, without injury to the metal which retains its fibrous structure, so that the welds not only have a high percentage of tensile strength, but can also be bent just as well as a solid bar. In carrying out this last-mentioned process, the pencil, so far as my knowledge extends, has heretofore been applied to the work by hand or through the interposition of a holder moved by hand in such manner as to either rest upon the work in spots or to move over it to and fro. This necessarily in practice has confined the work to small special adaptations, as it would obviously be impracticable for a workman to manipulate a large arc, say from fifty to one hundred horse-power, such as it is frequently desirable to employ. It is also obviously impossible for a workman to maintain the proper relation of the work to the arc, as he cannot so move the pencil by hand as to heat any considerable area, and if the pencil is allowed to remain stationary too long the work is injured and the movement of the pencil is very apt to break the arc and allow the heated work to become cool.

My invention is based upon the discovery I have made that the above-mentioned defects may be remedied, and practically perfect work produced by automatically and mechanically causing the arc to maintain a uniform relation to the work while moving constantly and quickly thereover.

My improvements to this end consist in certain novel combinations and organizations of instrumentalities herein described, and also specified in the claims at the end of this specification, whereby the pencil and work may be automatically and mechanically maintained in uniform relation to each other, while one is constantly traversed by the other with a gyratory motion, or one both transverse and longitudinal to the line of welding, so that the arc can be made to describe any desired figure at constant or varying rates of speed and any portion of the work may be evenly heated to the desired temperature.

In order to carry out my invention, I mount the pencil, preferably of carbon, upon an arm carried by a rotating shaft movable relatively to the work in such manner that the pencil can be adjusted both vertically and laterally relatively thereto, so as to bring the pencil and work in proper relation to cause it to move longitudinally or in the line of welding or heating, and also to gyrate laterally relatively thereto, so that the path of the arc may describe any desired figure either at constant or varying rates of travel, and any portion of the work may be evenly heated to the desired temperature. I traverse the carbon by an electric motor mounted upon the same carriage with it, which carriage may be moved by the same motor or by other suitable mechanical appliances. In some cases I also mount a hammer, hydraulic press, or other tool upon this carriage and actuate it by the same, or, preferably, by another electric motor. These appliances may either work simultaneously or successively with relation to the arc, suitable means being provided for this purpose. I find the direction or inclination of the arc to be largely dependent upon the position of the point of connection of the conductor with the work or anvil, which occasions great inconvenience, causing the arc to flicker or sometimes go out when the carbon moves. I obviate this objection by employing a connection movable relatively to the work or anvil in such manner that its connection thereto is always as nearly as may be opposite to or in the same longitudinal plane as the carbon electrode. In cases where the moving tool immediately follows the moving arc, I employ also a moving anvil of rigid material, such as steel, directly beneath the tool, and a moving body of refractory material or a bad conductor of heat, such as fire-brick, beneath the arc.

The accompanying drawings show so much apparatus specially applicable to the welding of tubes embodying my improvements as is necessary to illustrate their subject-matter.

That side of the machine where the carbon is situated I term the "front," the opposite the "rear." That side on the right of a person opposite to and facing the front of the machine I term the "right," the opposite the "left." Unless otherwise indicated, the parts are of usual approved construction.

Figure 2:
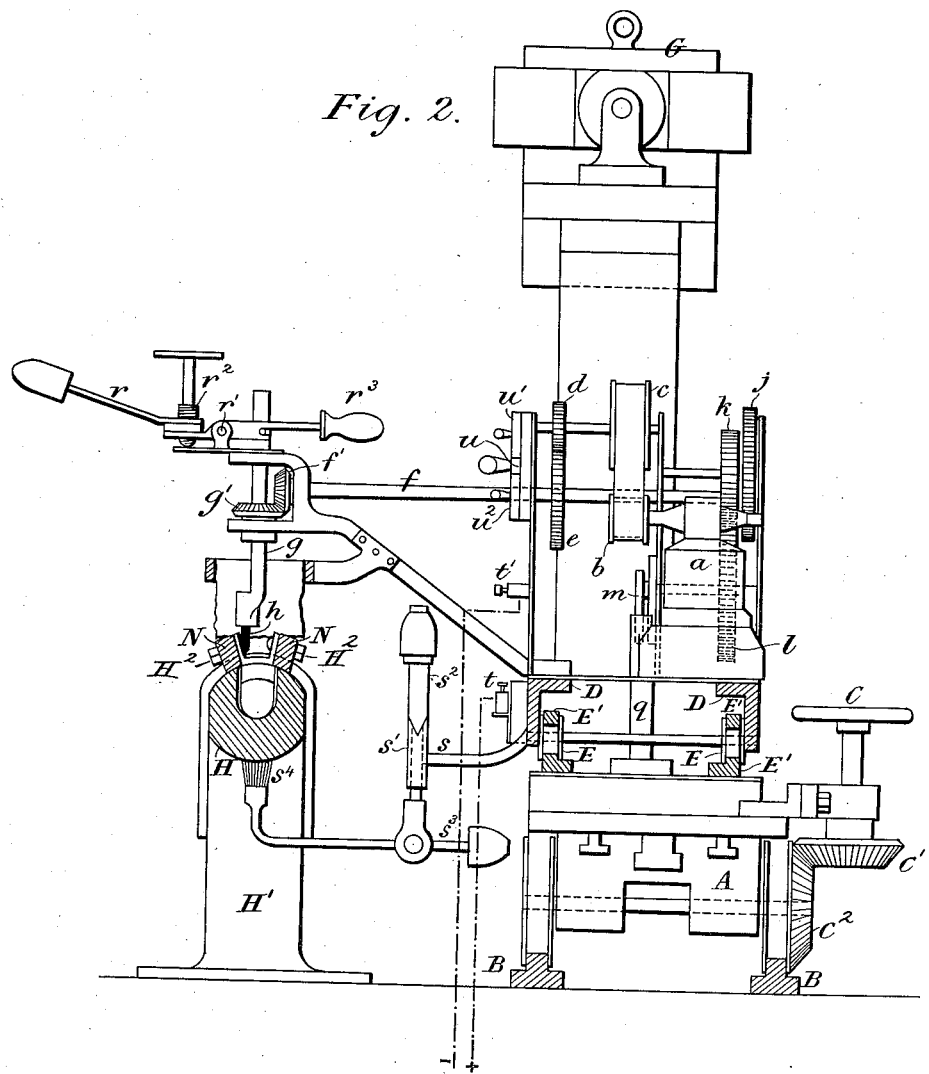
Figure 3:
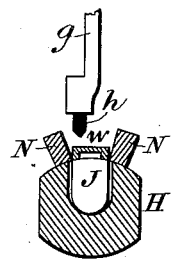
Figure 4:
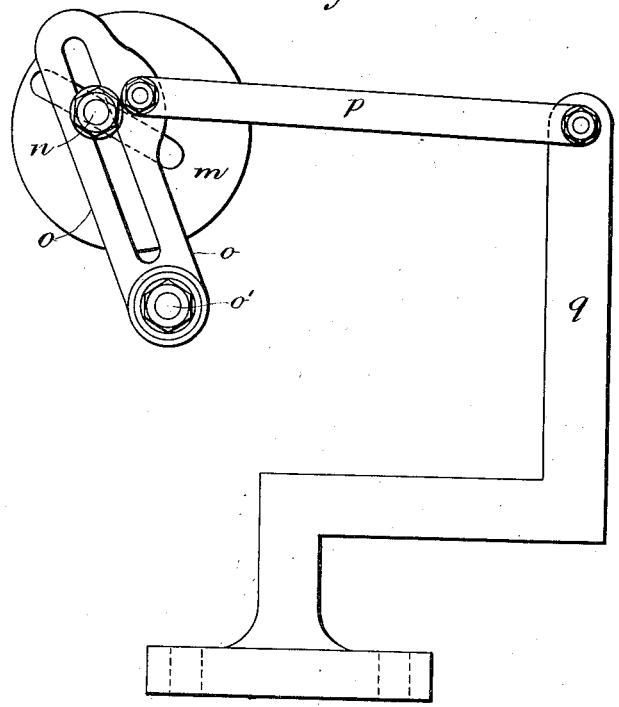

Figure 1 is a view in elevation of the front of the machine, with the mandrel guide or support, the anvil and the refractory block partly in vertical longitudinal section in the line of welding; Fig. 2, an elevation of the right-hand end of the machine, partly in vertical transverse section, taken just in front of the welding-line; Fig. 3, a transverse section through the mandrel-anvil and holding bars or clamps in the same plane as that of the corresponding section in Fig. 2, illustrating a modification of these parts; and Fig. 4, a front elevation, on an enlarged scale, showing the details of the mechanism regulating the traverse of the carbon.

A main or lower carriage A is shown as mounted on wheels running upon rails B, being moved to and fro thereon or held fast relatively thereto by a hand-wheel C, actuating a gear C' upon the carriage, engaging a corresponding gear $C^2$ on one of the wheels or its axle. A second or upper carriage D runs on wheels E, traversing guide-rails E' on the main carriage and reciprocates parallel therewith, as hereinafter described.

A pneumatic or other hammer F is driven by a belt F' from an electro-motor G, both hammer and motor being mounted upon and traversing with the main carriage A. Their details of construction, being ordinary and well known and forming no part of this invention, are not fully shown in the drawings.

A mandrel guide or support H, fixed upon a standard H', secured upon the bed-plate or frame of the machine, is slotted longitudinally on its upper side to receive an anvil J and a block L, of refractory material, which are connected together and to a rod M, fixed on the main carriage A. The anvil and refractory block consequently move lengthwise with the rod and main carriage relatively to the slotted fixed mandrel. The hammer, anvil, and refractory block being all mounted upon the main carriage, necessarily move with it. The carbon is carried by the upper carriage, which, as above explained, is mounted upon the lower one, the organization being such that, as the lower carriage is moved to cause the carbon and hammer to operate successively on different parts of the seam of the tube, the anvil and refractory block move with it and always remain under the hammer and carbon, respectively. The work is held down upon the mandrel by holding bars or clamps N, arranged parallel with and on each side of its slot, or of the anvil traversing therein. Their left-hand ends are pivoted at $H^2$ to the mandrel or its support, while their right-hand ends are secured to right and left handed screw-links O, by which their pressure upon the work may be adjusted. They may also conveniently be operated by hydraulic presses in well-known ways.

An electro-motor $a$ on the upper carriage D actuates a belt-pulley $b$, driving through its belt a second pulley $c$, fixed to whose axis is a pinion $d$, gearing with a spur-wheel $e$, to one end of whose axis $f$ is fixed a bevel-pinion $f'$, gearing with a bevel-pinion $g'$ upon a vertical axis or shaft $g$, which moves freely endwise through but turns with the pinion. The carbon H is carried by an eccentric or crank arm on this shaft, being adjustable laterally relatively to its axis in well known ways to vary its eccentricity or relation thereto. The other or right-hand end of the transverse axis or shaft $f$ carries a spur-pinion $f^2$, gearing with a corresponding wheel $j$, to whose axis is fixed a spur-pinion $k$, gearing with a spur-wheel $l$, fixed to whose axis or shaft is a disk $m$, Fig. 4. This disk has a radial slot in which a pin $n$ can be adjusted at any desired distance from the axis or center of the disk. This pin is also free to slide in a slot in a crank-arm $o$, rocking on a pivot $o'$ on the upper carriage D. An arm or pitman $p$ is pivoted to the slotted rocking crank-arm $o$ near its outer end at one end and at the other to a standard $q$ on the lower carriage A. The result of this arrangement is that the upper carriage is reciprocated upon the lower one by the revolution of the disk $m$, the motion of the upper carriage in one direction being faster than in the other, while at the same time the carbon circles about its axis or shaft $g$. The work being held in a fixed position, it results from the organization above described that while the lower carriage remains stationary the carbon gyrates over the work, heating a patch thereon equal in length to twice the distance of the crank-pin $n$, from the center of the disk $m$, and in width to twice the distance of the carbon from its axis. This axis or shaft is free to slide endwise up and down through its pinion $g'$, but is prevented by a groove and feather from turning relatively to it, as above explained. Its upper end is supported by a counterbalanced lever $r$, rocking on a pivot $r'$, and carrying a set-screw $r^2$, by which the height of the carbon or its relation to the work may be adjusted. This lever terminates in a handle $r^3$, by which the workman can depress the lever and carbon against the counterbalanced weight and strike the arc by approaching the carbon to the work. A bracket $s$ on the upper carriage carries a tubular socket $s'$, which receives a weighted rod $s^2$, which rests upon corresponding inclines on the top of the socket, so that the rod can be turned in the socket, but always tends to resume its normal position. A counterbalanced lever $s^3$ carries a brush $s^4$, which presses against the under side of the mandrel H. This brush-lever rocks vertically on a pivot on the horizontally-turning rod $s^2$, thus enabling the brush to swing both vertically and horizontally.

The positive pole of the arc circuit is attached to the terminal $t$ upon the bracket $s$, through which the current passes by the socket $s'$, rod $s^2$, brush-lever $s^3$, and brush $s^4$ to the mandrel H, and since both this brush and the carbon are mounted on the upper carriage the electric circuit or connection through the fixed mandrel and the work is always approximately in a direct line with the carbon, thus insuring the playing of the arc squarely upon the work. The negative wire of the arc circuit is attached to the terminal $t'$, whence the current passes by a wire to a switch-board $u$ on the main carriage, and through the frame, the shaft $f$, the vertical shaft $g$, and carbon-electrode $h$ to the work. The wires of the motor G, which works the hammer, are attached to terminals upon the switch-board $u'$, while those of the motor $a$, which moves the carbon and upper carriage, are attached to terminals on the switch-board $u^2$, all these switch-boards being shown as mounted on the upper carriage B.

The drawings show three separate circuits, one for supplying the arc, one for the hammer, and one for moving the upper carriage; but it will be understood that by a suitable arrangement of switches the work could be done by one or two circuits; but these are not usually convenient arrangements, because the various operations do not all require the same power, and therefore separate circuits are preferable.

In some cases, in order to prevent the burning of the work, I do not operate directly upon it by the arc, but interpose a thin screen $w$, Fig. 3, of carbon or other conducting refractory material between the arc and the work. This device is also applicable to other organizations for heating and welding by the electric arc. Thus, for instance, when it is desired to heat or melt metals out of contact with the air, I inclose them in a box of thin carbon plates and connect one pole of the circuit to the box and the other to a carbon or pencil mechanically moved, as above described, on the opposite side of the box.

What I claim is—

1. An apparatus for heating or welding by the electric arc, in which the work forms one electrode, comprising a pencil forming the other electrode mounted to move longitudinally and transversely and mechanism for effecting these movements.

2. An apparatus for heating or welding by the electric arc, in which the work forms one electrode, comprising a laterally and longitudinally movable pencil forming the other electrode, mounted to move at a fixed distance from the work, and mechanism for effecting these movements.

3. An apparatus for heating or welding by the electric arc, in which the work forms one electrode, comprising a pencil forming the other electrode, means for holding the pencil at a fixed distance from the work, and mechanism constructed and operated to contiually change the position of the work and pencil relatively to each other, both longitudinally and laterally with respect to the line of heating or welding, substantially as set forth.

4. In apparatus for heating and welding by the electric arc where the work forms one electrode and a pencil the other electrode, the combination of a support for the work, a carriage, mechanism which moves the carriage relatively to the work, a pencil on the carriage, and mechanism which moves the pencil relatively to the carriage.

5. In apparatus for heating and welding by the electric arc where the work forms one electrode and a pencil the other electrode, the combination of a support for the work, a carriage movable along the line to be heated or welded, a second carriage to support the pencil and mechanism which moves the pencil relatively to its supporting-carriage, and the latter relatively to the work.

6. In apparatus for heating and welding by the electric arc where the work forms one electrode and the pencil the other electrode, the combination of a support for the work, a carriage, a pencil mounted thereon, mechanism which moves the pencil relatively to its supporting-carriage, and the latter relatively to the work, a tool, and mechanism which actuates it.

7. In apparatus for heating and welding by the electric arc where the work forms one electrode and a pencil the other electrode, the combination of a support for the work, a carriage movable along the line to be heated or welded, a hammer, press, or other tool upon the carriage, mechanism for actuating the tool, a second carriage, a pencil supported thereon, and mechanism which moves the pencil relatively to the second carriage and the second carriage relatively to the first.

8. In apparatus for heating and welding by the electric arc where the work forms one electrode and a pencil the other electrode, the combination of a support for the work, a carriage movable along the line to be heated or welded, a support for the pencil, and a support for the other electrode, both mounted on this carriage, the organization being such that one electrode is in proximity to the work and the other in direct contact with its support, the two being directly opposite each other, and mechanism which moves them coincidently relatively to the work, so that the two electrodes are always in direct line with each other.

9. In apparatus for heating and welding by the electric arc where the work forms one electrode and a pencil the other electrode, the combination of a support for the work, a carriage to suport the pencil, and also a hammer, press, or other tool, an anvil beneath the hammer, press, or tool, and a block of refractory material beneath the pencil, both block and anvil being connected to and moving with the carriage.

10. In apparatus for heating and welding by the electric arc where the work forms one electrode and a pencil the other electrode, the combination of a support for the work, a support for the pencil, and a thin sheet of refractory conducting material, such as carbon, interposed between the pencil and work to heat the latter by radiation, as set forth.

11. In apparatus for heating and welding by the electric arc where the work forms one electrode and a pencil the other electrode, the combination of a support for the work, a support for the pencil movable along the line to be heated or welded, and clamps parallel with this line of movement, between which and the support the work is pressed near the line of heating or welding, as set forth.

12. The combination, substantially as hereinbefore set forth, of a support for the work, a carriage, mechanism for moving it along the welding-line, a second carriage movable upon and parallel with the first one, a support for the pencil carried thereby, and mechanism which moves the pencil over the work faster in one direction than in the other.

13. The combination, substantially as hereinbefore set forth, of a support for the work, a carriage movable along the welding-line, a second carriage movable upon and parallel with the first one, a support for the pencil carried thereby, mechanism which moves the pencil over the work, and a block of conducting material, such as carbon, interposed between the pencil and work.

14. The combination, substantially as hereinbefore set forth, of a support for the work, a carriage movable along the welding-line, a second carriage movable upon and parallel with the first one, a support for the pencil carried thereby, mechanism which moves the pencil over the work, and the second carriage relatively to the first, an operating-tool, its actuating mechanism, an anvil, and a block of refractory material, the tool, anvil, and block all being mounted upon the second carriage, as and for the purposes set forth.

15. The combination, substantially as hereinbefore set forth, of a support for the work, holding bars or clamps thereon parallel with the welding-line, a carriage movable parallel with said line, a tool, its actuating mechanism, and an anvil fixed on said frame, a second carriage movable thereon, a pencil-support carried thereby, and mechanism for traversing the main carriage for moving the second carriage thereon and for moving the pencil over the work.

16. The combination, substantially as hereinbefore set forth, of a support for the work, holding bars or clamps thereon parallel with the welding-line, a pencil, mechanism which gyrates it over the work, and a carbon block interposed between the pencil and work.

17. The combination, substantially as hereinbefore set forth, of a work-support, a carriage movable parallel with the welding-line, a pencil thereon on one side of the support, a brush or other sliding electrode, also mounted on this carriage, and mechanism traversing said brush and pencil relatively to the holder, the organization being such that the pencil and brush are maintained in direct line with each other, so as to secure the proper impingement of the arc upon the work.

HENRY HOWARD.

Witnesses:
 STANLEY MCKNIGHT HOWARD,
*Student, Oxford, England.*
 EDWIN EDWARDS,
*Gardener to Chaton Stone, near Kiddermoyle, England.*